(12) United States Patent
Lee et al.

(10) Patent No.: US 10,798,615 B2
(45) Date of Patent: Oct. 6, 2020

(54) BROADCAST SIGNAL RECEIVING APPARATUS AND CONTROL METHOD THEREOF

(71) Applicant: Samsung Electronics Co., Ltd., Suwon-si, Gyeonggi-do (KR)

(72) Inventors: Sungsoo Lee, Suwon-si (KR); Donguk Seo, Suwon-si (KR); Bumyoul Bae, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/222,067

(22) Filed: Dec. 17, 2018

(65) Prior Publication Data

US 2019/0200263 A1 Jun. 27, 2019

(30) Foreign Application Priority Data

Dec. 22, 2017 (KR) ........................ 10-2017-0178595

(51) Int. Cl.
*H04W 36/00* (2009.01)
*H04W 76/15* (2018.01)
*H04H 60/11* (2008.01)
*H04W 72/08* (2009.01)
*H04W 72/04* (2009.01)

(52) U.S. Cl.
CPC ........ *H04W 36/0007* (2018.08); *H04H 60/11* (2013.01); *H04W 36/0069* (2018.08); *H04W 36/03* (2018.08); *H04W 76/15* (2018.02); *H04W 72/0453* (2013.01); *H04W 72/082* (2013.01)

(58) Field of Classification Search
None
See application file for complete search history.

(56) References Cited

U.S. PATENT DOCUMENTS

| 5,668,749 A * | 9/1997 | Corleto | H03D 3/007 |
| | | | 708/490 |
| 2009/0122928 A1* | 5/2009 | Twitto | H04L 25/0212 |
| | | | 375/344 |
| 2010/0073219 A1* | 3/2010 | He | H04B 17/23 |
| | | | 342/173 |

(Continued)

OTHER PUBLICATIONS

Extended European Search Report dated Apr. 11, 2019 in European Patent Application No. 18213295.1.

*Primary Examiner* — Xavier S Wong
(74) *Attorney, Agent, or Firm* — Staas & Halsey LLP

(57) ABSTRACT

A broadcast signal receiving apparatus comprises a tuner configured to be tuned to a locking frequency selected corresponding to a broadcast signal and receive the broadcast signal at the selected locking frequency; a communicator configured to perform wireless communication with an external apparatus through a plurality of channels different in a frequency band from each other; and a processor configured to control the communicator to perform the wireless communication through a channel having less interference between the selected locking frequency and the frequency band among the plurality of channels. According to an exemplary embodiment, the frequency interference with the wireless communication can be avoided in advance in terms of receiving the broadcast signal. Further, image quality can be guaranteed even when the wireless communication is used, in terms of receiving the broadcast signal.

17 Claims, 13 Drawing Sheets

(56) References Cited

U.S. PATENT DOCUMENTS

| | | |
|---|---|---|
| 2010/0304685 A1 | 12/2010 | Wietfeldt et al. |
| 2010/0316098 A1 | 12/2010 | Pals et al. |
| 2014/0062609 A1* | 3/2014 | Lee ................ H03B 5/364 331/116 FE |
| 2014/0064420 A1 | 3/2014 | Ling et al. |
| 2016/0183268 A1* | 6/2016 | Albano ............ H04L 12/2801 370/252 |
| 2016/0249224 A1 | 8/2016 | Prasad et al. |

* cited by examiner

FIG. 6

| ADC Sampling Freq (MHz) 61 | Wireless Communication Freq (MHz) 62 | Band Width (MHz) 63 | Mixing Freq (MHz) 64 | Min Freq (MHz) 65 | Max Freq (MHz) 66 | Tuner Locking Freq (MHz) 67 | Interference Value Min < Tuner Freq < Max (MHz) 68 | remark 69 |
|---|---|---|---|---|---|---|---|---|
| Tuner ADC Sampling Freq | Wireless Communication Freq Causing Interference ex) Wi-Fi, BT, ZigBee, etc. | Channel Bandwidth | Difference Between ADC Sampling and Wireless Communication Frequencies ADC Sampling Freq - Wireless Communication Freq or ADC Sampling Freq X 2 - Wireless Communication Freq | Mixing Freq - Bandwidth/2 | Mixing Freq + Bandwidth/2 | Frequency Being Currently Occupied By Tuner | Interference Value True : Interference False : No Interference Determine Whether Tuner Freq Belongs To Mixing Frequency | Request For Change Wireless Communication Freq According to True or False |
| Example #1 ||||||||||
| 2700 | 2412 | 20 | 288 | 278 | 298 | 285 | TRUE | Change Wireless Communication Freq |
| 2700 | 2412 | 20 | 288 | 278 | 298 | 333 | FALSE | Maintain Current State |
| Example #1 ||||||||||
| 2700 | 5200 | 40 | 200 | 180 | 220 | 190 | TRUE | Change Wireless Communication Freq |
| 2700 | 5180 | 80 | 220 | 180 | 260 | 333 | FALSE | Maintain Current State |

FIG. 7

| Wi-Fi 2.4GHz Bandwodth 20MHz Mode | | |
|---|---|---|
| Tuner Locking Freq(MHz) | Wi-Fi Problem Channel(Unavailable) | Wi-Fi Avoid Channel(Available) |
| 278 ~ 298 | | 5,6,7,8,9,10,11,12,13,14 |
| 273 ~ 293 | 1,2,3,4 | 6,7,8,9,10,11,12,13,14 |
| 268 ~ 288 | 1,2,3,4,5 | 7,8,9,10,11,12,13,14 |
| 263 ~ 283 | 1,2,3,4,5,6 | 8,9,10,11,12,13,14 |
| 258 ~ 278 | 1,2,3,4,5,6,7 | 1,9,10,11,12,13,14 |
| 253 ~ 273 | 2,3,4,5,6,7,8 | 1,2,10,11,12,13,14 |
| 248 ~ 268 | 3,4,5,6,7,8,9 | 1,2,3,11,12,13,14 |
| 243 ~ 263 | 4,5,6,7,8,9,10 | 1,2,3,4,12,13,14 |
| 238 ~ 258 | 5,6,7,8,9,10,11 | 1,2,3,4,5,13,14 |
| 233 ~ 253 | 6,7,8,9,10,11,12 | 1,2,3,4,5,6,14 |
| 228 ~ 248 | 7,8,9,10,11,12,13 | 1,2,3,4,5,6,7 |
| 223 ~ 243 | 8,9,10,11,12,13,14 | 1,2,3,4,5,6,7,8 |
| 218 ~ 238 | 9,10,11,12,13,14 | 1,2,3,4,5,6,7,8,9 |
| 213 ~ 233 | 10,11,12,13,14 | 1,2,3,4,5,6,7,8,9,10 |
| | 11,12,13,14 | |

FIG. 8

| Wi-Fi 2.4GHz Bandwodth 40MHz Mode | | |
|---|---|---|
| Tuner Locking Freq(MHz) | Wi-Fi Problem Channel(Unavailable) | Wi-Fi Avoid Channel(Available) |
| 258 ~ 298 | 3 | 11 |
| 218 ~ 258 | 11 | 3 |

| Wi-Fi 5GHz Bandwodth 20MHz Mode ||| 
|---|---|---|
| Tuner Locking Freq(MHz) | Wi-Fi Problem Channel (Unavailable) | Wi-Fi Avoid Channel(Available) |
| 70 ~ 90 | 64 | 36, 40, 44, 48, 52, 56, 60, 100, 104, 108, 112, 116 120, 124, 128, 132, 136, 140, 149, 153, 157, 161 |
| 90 ~ 110 | 60, 100 | 36, 40, 44, 48, 52, 56, 64, 104, 108, 112, 116, 120 124, 128, 132, 136, 140, 149, 153, 157, 161 |
| 110 ~ 130 | 56, 104 | 36, 40, 44, 48, 52, 60, 64, 100, 108, 112, 116, 120 124, 128, 132, 136, 140, 149, 153, 157, 161 |
| 130 ~ 150 | 52, 108 | 36, 40, 44, 48, 56, 60, 64, 100, 104, 112, 116, 120 124, 128, 132, 136, 140, 149, 153, 157, 161 |
| 150 ~ 170 | 48, 112 | 36, 40, 44, 52, 56, 60, 64, 100, 104, 108, 116, 1201 24, 128, 132, 136, 140, 149, 153, 157, 161 |
| 170 ~ 190 | 44, 116 | 36, 40, 48, 52, 56, 60, 64, 100, 104, 108, 112, 120 124, 128, 132, 136, 140, 149, 153, 157, 161 |
| 190 ~ 210 | 40, 120 | 36, 44, 48, 52, 56, 60, 64, 100, 104, 108, 112, 116 124, 128, 132, 136, 140, 149, 153, 157, 161 |
| 210 ~ 230 | 36, 124 | 40, 44, 48, 52, 56, 60, 64, 100, 104, 108, 112, 116 120, 128, 132, 136, 140, 149, 153, 157, 161 |
| 230 ~ 250 | 128 | 36, 40, 44, 48, 52, 56, 60, 64, 100, 104, 108, 112, 116 120, 124, 132, 136, 140, 149, 153, 157, 161 |
| 250 ~ 270 | 132 | 36, 40, 44, 48, 52, 56, 60, 64, 100, 104, 108, 112, 116 120, 124, 128, 136, 140, 149, 153, 157, 161 |
| 270 ~ 290 | 136 | 36, 40, 44, 48, 52, 56, 60, 64, 100, 104, 108, 112, 116 120, 124, 128, 132, 140, 149, 153, 157, 161 |
| 290 ~ 310 | 140 | 36, 40, 44, 48, 52, 56, 60, 64, 100, 104, 108, 112, 116 120, 124, 128, 132, 136, 149, 153, 157, 161 |
| 335 ~ 355 | 149 | 36, 40, 44, 48, 52, 56, 60, 64, 100, 104, 108, 112, 116 120, 124, 128, 132, 136, 140, 153, 157, 161 |
| 355 ~ 375 | 153 | 36, 40, 44, 48, 52, 56, 60, 64, 100, 104, 108, 112, 116 120, 124, 128, 132, 136, 140, 149, 157, 161 |
| 375 ~ 395 | 157 | 36, 40, 44, 48, 52, 56, 60, 64, 100, 104, 108, 112, 116 120, 124, 128, 132, 136, 140, 149, 153, 161 |
| 395 ~ 415 | 161 | 36, 40, 44, 48, 52, 56, 60, 64, 100, 104, 108, 112, 116 120, 124, 128, 132, 136, 140, 149, 153, 157 |

BROADCAST SIGNAL RECEIVING APPARATUS AND CONTROL METHOD THEREOF

CROSS-REFERENCE TO RELATED APPLICATIONS

This application is based on and claims priority under 35 U.S.C. § 119 to Korean Patent Application No. 10-2017-0178595 filed on Dec. 22, 2017 in the Korean Intellectual Property Office, the disclosure of which is incorporated by reference herein in its entirety.

BACKGROUND

1. Field

The disclosure relates to a broadcast signal receiving apparatus and a control method thereof, and more particularly to a broadcast signal receiving apparatus for receiving a broadcast signal in a wireless communication environment and a control method thereof.

2. Description of the Related Art

A set-top box, a television (TV), various audio/video (A/V) devices including a digital versatile disc (DVD)/Blu-ray disc (BD) player, etc., and a cable modem are in need of a digital/analog receiver such as a tuner to receive a broadcast signal.

As a broadcast and cable modem market has recently served as a gateway, there is a tendency for a device to include not only the tuner but also a module for wireless communication such as Wi-Fi, Bluetooth, ZigBee, etc.

However, when the tuner and the wireless communication module are used at the same time, frequency interference between them may cause a problem that a screen and data are garbled.

Further, this problem affects a screen being viewed by a user, and it is thus difficult to guarantee image quality.

SUMMARY

An aspect of the present disclosure is to provide a broadcast signal receiving apparatus and a control method thereof, in which frequency interference caused by wireless communication is previously avoided in terms of receiving a broadcast signal.

Another aspect of the present disclosure is to provide a broadcast signal receiving apparatus and a control method thereof, in which image quality is guaranteed even when wireless communication is used in receiving a broadcast signal.

In accordance with an aspect of the disclosure, there is provided a broadcast signal receiving apparatus comprising: a tuner configured to be tuned to a locking frequency selected corresponding to a broadcast signal and receive the broadcast signal at the selected locking frequency; a communicator configured to perform wireless communication with an external apparatus through a plurality of channels different in a frequency band from each other; and a processor configured to control the communicator to perform the wireless communication through a channel having less interference between the selected locking frequency and the frequency band among the plurality of channels. According to an exemplary embodiment, the frequency interference with the wireless communication can be avoided in advance in terms of receiving the broadcast signal. Further, image quality can be guaranteed even when the wireless communication is used, in terms of receiving the broadcast signal.

The tuner applies analog-to-digital (AD) conversion to a broadcast signal with a predetermined sampling frequency, and the processor uses the sampling frequency to determine the channel having less interference. Thus, the channels where the frequency interference occurs during the wireless communication can be avoided on the basis of the sampling frequency used by the tuner.

The processor determines a channel to be used for the wireless communication, based on a frequency interference section where interference occurs between the locking frequency and the frequency band. Thus, the section where interference may occur between the locking frequency of the tuner and the frequency band to be occupied by the wireless communication is stored in advance at manufacture, and therefore the channel causing no interference can be used when the broadcast signal is received at the selected locking frequency.

The frequency interference section is determined based on a difference between the sampling frequency and the frequency band. Thus, the difference between the sampling frequency of the tuner and the frequency band of the wireless communication can be defined as the frequency at which the interference with the wireless communication occurs.

The processor stores information about channels, which are available for the communicator with regard to the locking frequencies based on the frequency interference section, in a storage, and controls the communicator to adjust a scan list for the channels based on the stored information. Thus, the channels causing the interference are previously defined according to the locking frequencies of the tuner, and therefore scanning can be carried out including only the channels causing no interference with the wireless communication.

The processor changes a channel being used by the communicator when the locking frequency belongs to the frequency interference section. Thus, when the locking frequency for receiving the broadcast signal belongs to the section where the interference occurs, the frequency for the wireless communication can be changed.

The processor inactivates the communicator in response to a user's input when the locking frequency belongs to the frequency interference section. Thus, when the locking frequency for receiving the broadcast signal belongs to the section where the interference occurs, the use of the wireless communication can be restricted by a user's selection.

The communicator communicates with the external apparatus through at least one communication method among Wi-Fi, Bluetooth, ZigBee, and Z-wave. Thus, various wireless communication methods can be all applied when the section causing the interference is defined according to the locking frequencies of the tuner.

The tuner comprises a full-band capture tuner. Thus, when the full-band capture tuner is used, the wireless communication can be performed using the channel having less interference with the locking frequency of the tuner.

In accordance with an aspect of the disclosure, there is provided a computer program product comprising: a memory configured to store a plurality of instructions; and a processor, wherein the instruction is executed by the processor and controls communication to be performed using a channel, which has less interference between a locking frequency selected for receiving a broadcast signal and a frequency band, among a plurality of channels different in the frequency band from each other. According to an exemplary embodiment, the frequency interference with the wireless communication can be avoided in advance in terms of receiving the broadcast signal. Further, image quality can be guaranteed even when the wireless communication is used, in terms of receiving the broadcast signal.

The instruction determines the channel having less interference based on a sampling frequency used in applying analog-to-digital (AD) conversion to the broadcast signal. Thus, the channels where the frequency interference occurs during the wireless communication can be avoided on the basis of the sampling frequency used by the tuner.

In accordance with an aspect of the disclosure, there is provided a method of controlling a broadcast signal receiving apparatus comprising a tuner configured to be tuned to a locking frequency selected corresponding to a broadcast signal and receive the broadcast signal at the selected locking frequency, and a communicator configured to perform wireless communication with an external apparatus through a plurality of channels different in a frequency band from each other, the method comprising: determining a channel having less interference between the locking frequency selected by the tuner and the frequency band of the communicator among the plurality of channels of the communicator; and controlling the communicator to perform the wireless communication with the external apparatus through the determined channel. According to an exemplary embodiment, the frequency interference with the wireless communication can be avoided in advance in terms of receiving the broadcast signal. Further, image quality can be guaranteed even when the wireless communication is used, in terms of receiving the broadcast signal.

Further comprising: by the tuner, applying analog-to-digital (AD) conversion to a broadcast signal with a predetermined sampling frequency, and determining the channel having less interference based on the sampling frequency. Thus, the channels where the frequency interference occurs during the wireless communication can be avoided on the basis of the sampling frequency used by the tuner.

Further comprising: determining a channel to be used for the wireless communication, based on a frequency interference section where interference occurs between the locking frequency and the frequency band. Thus, the section where interference may occur between the locking frequency of the tuner and the frequency band to be occupied by the wireless communication is stored in advance at manufacture, and therefore the channel causing no interference can be used when the broadcast signal is received at the selected locking frequency.

The frequency interference section is determined based on a difference between the sampling frequency and the frequency band. Thus, the difference between the sampling frequency of the tuner and the frequency band of the wireless communication can be defined as the frequency at which the interference with the wireless communication occurs.

Further comprising: storing information about channels which are available for the communicator with regard to the locking frequencies based on the frequency interference section; and by the communicator, adjusting a scan list for the channels based on the stored information. Thus, the channels causing the interference are previously defined according to the locking frequencies of the tuner, and therefore scanning can be carried out including only the channels causing no interference with the wireless communication.

Further comprising changing a channel being used by the communicator when the locking frequency belongs to the frequency interference section. Thus, when the locking frequency for receiving the broadcast signal belongs to the section where the interference occurs, the frequency for the wireless communication can be changed.

Further comprising inactivating the communicator in response to a user's input when the locking frequency belongs to the frequency interference section. Thus, when the locking frequency for receiving the broadcast signal belongs to the section where the interference occurs, the use of the wireless communication can be restricted by a user's selection.

The communicator communicates with the external apparatus through at least one communication method among Wi-Fi, Bluetooth, ZigBee, and Z-wave. Thus, various wireless communication methods can be all applied when the section causing the interference is defined according to the locking frequencies of the tuner.

The tuner comprises a full-band capture tuner. Thus, when the full-band capture tuner is used, the wireless communication can be performed using the channel having less interference with the locking frequency of the tuner.

BRIEF DESCRIPTION OF THE DRAWINGS

The above and/or other aspects will become apparent and more readily appreciated from the following description of exemplary embodiments, taken in conjunction with the accompanying drawings, in which:

FIG. 6 illustrates a table for determining whether a locking frequency belongs to a frequency interference section according to one exemplary embodiment;

FIGS. 7 to 11 illustrate tables for defining channels available and unavailable according to locking frequencies during wireless communication according to one exemplary embodiment;

DETAILED DESCRIPTION

Below, exemplary embodiments of the present disclosure will be described in detail with reference to accompanying drawings so as to be easily realized by a person having an ordinary skill in the art. Further, the present disclosure may be embodied in various forms without being limited to the exemplary embodiments set forth herein.

Figure 1:
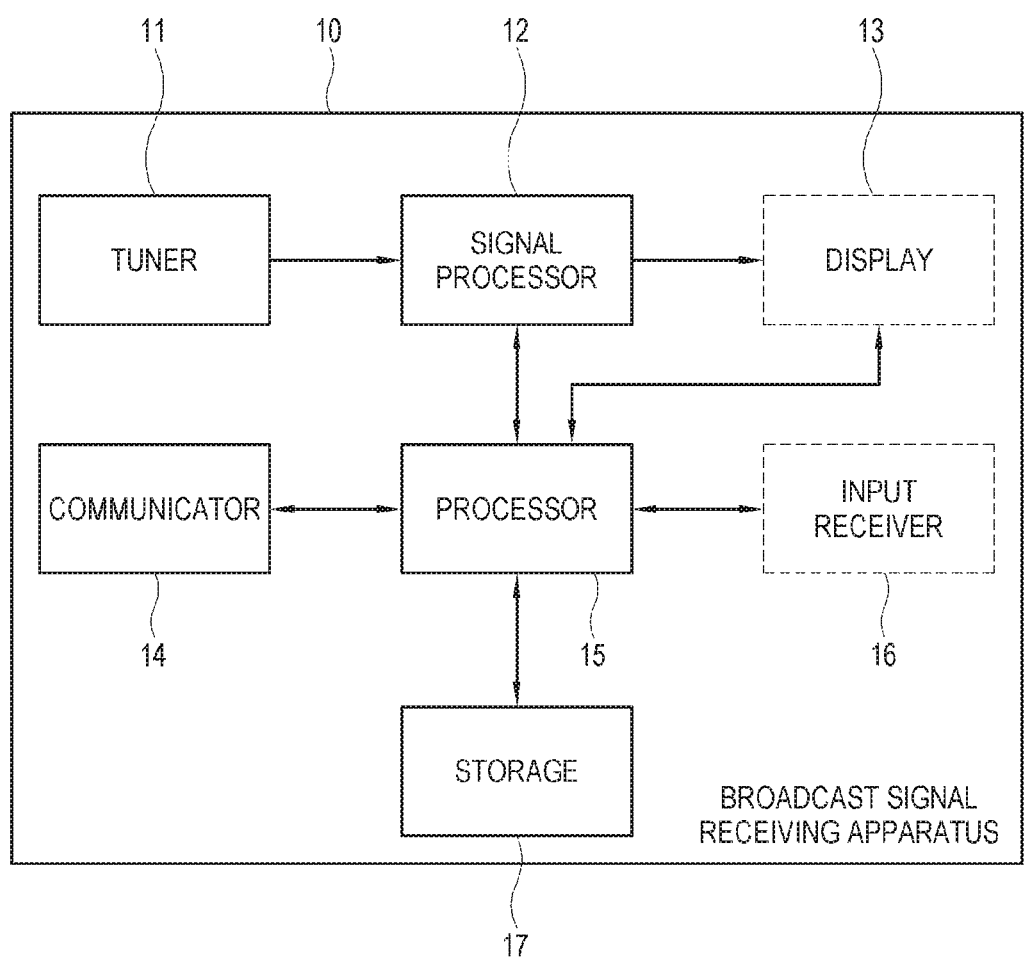
FIG. 1 is a block diagram of a broadcast signal receiving apparatus according to one exemplary embodiment.

FIG. 1 is a block diagram of a broadcast signal receiving apparatus according to one exemplary embodiment. As shown in FIG. 1, a broadcast signal receiving apparatus 10 according to this exemplary embodiment may include a tuner 11, a signal processor 12, a communicator 14, a storage 17 and a processor 15, and may additionally a display 13 and an input receiver 16. The broadcast signal receiving apparatus 10 may for example be materialized by a set-top box (STB), a cable modem, a TV, a smart phone, a tablet computer, etc., or may for example be materialized by various audio/video (A/V) apparatus such as a digital versatile disc (DVD)/Blu-ray disc (BD) player, etc. Thus, the broadcast signal receiving apparatus 10 is not limited to the following exemplary embodiments with respect to the kind of apparatuses, but applied to any apparatus as long as it is capable of transmitting and receiving a plurality of signals. For example, the broadcast signal receiving apparatus 10 may be materialized by a TV which is also used as an access point (AP).

The elements included in the broadcast signal receiving apparatus 10 are not limited to those according to one exemplary embodiment, and may exclude some elements or additionally include other elements.

The tuner 11 receives a broadcast signal or an image signal. The image signal may for example include a video or graphic signal. The tuner 11 may be provided in various forms in accordance with the formats of the broadcast signal and image signal to be received, and the types of the broadcast signal receiving apparatus 10. For example, the tuner 11 may be materialized by a tuner capable of receiving a satellite signal or a radio frequency (RF) broadcast signal transmitted from a broadcasting station.

The tuner 11 may for example be materialized by a full-band capture tuner to receive multi-channel video or Docsis 3.0 or higher. For example, the tuner 11 may receive a broadcast signal through not one channel but multi-channels such as 16, 24, or 32 channels.

Figure 2:
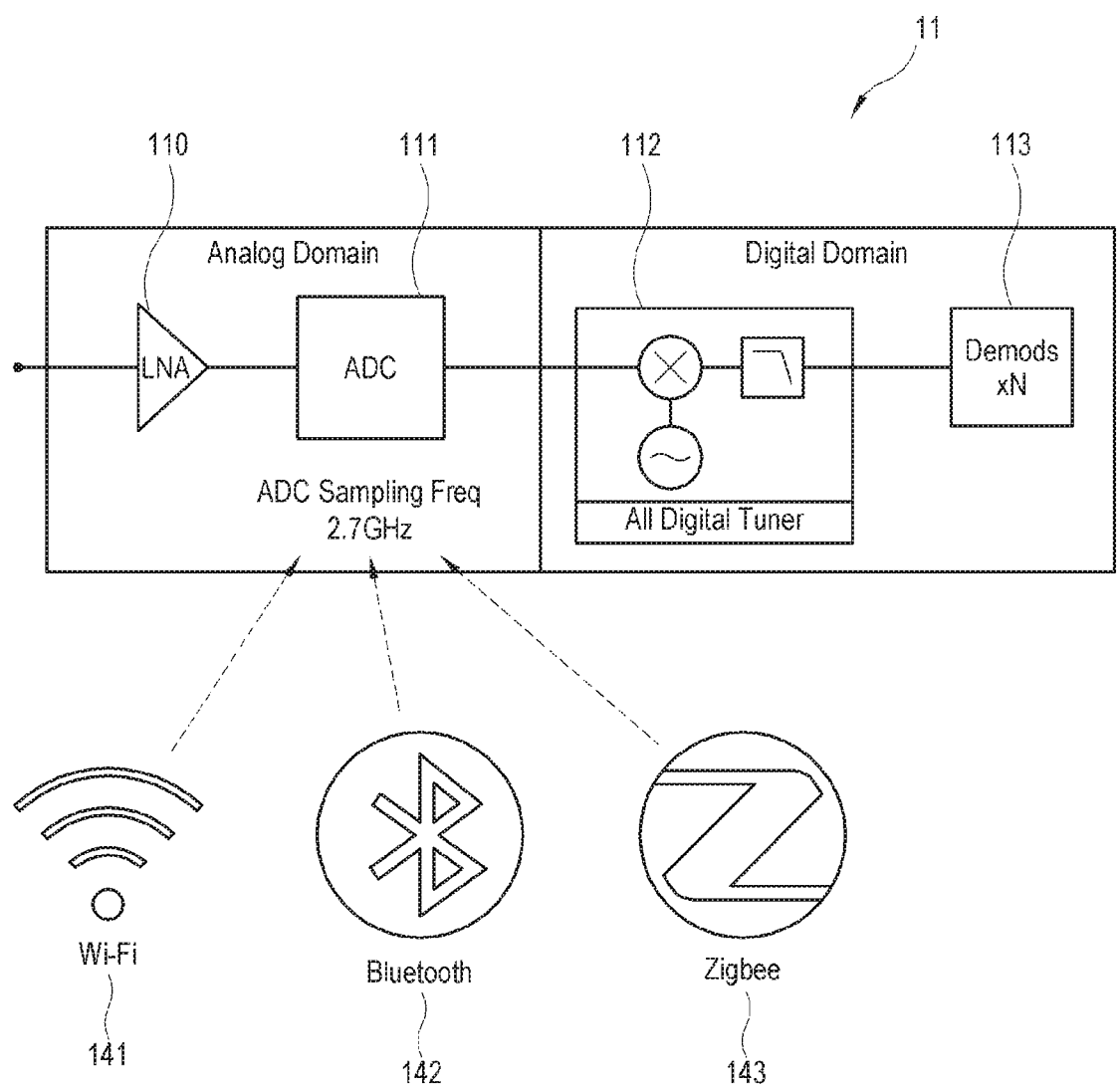
FIG. 2 is a schematic view illustrating an example that frequency interference occurs between a tuner and a wireless communication module according to one exemplary embodiment.

As shown in FIG. 2, the tuner 11 includes a low noise amplifier (LNA) 110, an analog-digital converter (ADC) 111, a channel scanner 112, and a demodulator 113. The LNA 110 is provided as a built-in amplifier of an antenna and amplifies a received broadcast signal.

The ADC 111 converts a received analog signal into a digital signal, and the channel scanner 112 scans signals of multi-channels from the digital broadcast signal. The demodulator 113 restores each signal of the scanned multi-channels into an original signal. With this configuration, the tuner 11 locks a frequency of a specific channel so that a broadcast image can be displayed on a screen.

Figure 3:
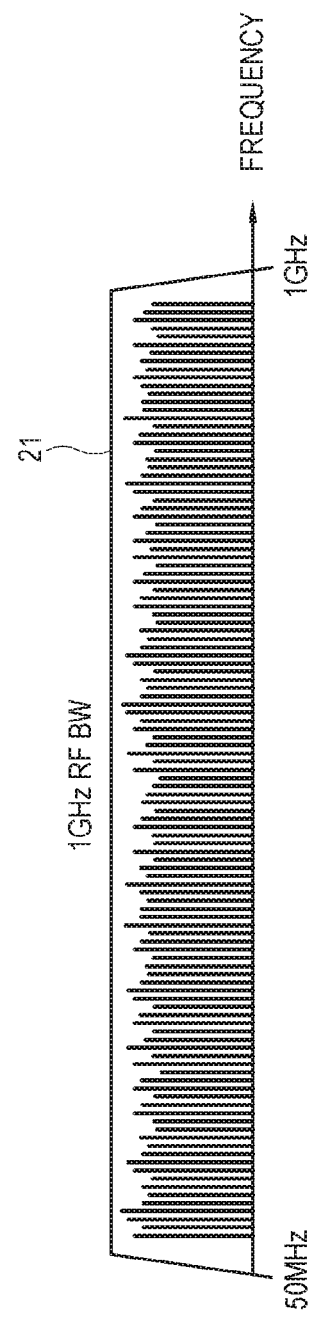
FIG. 3 illustrates an example of a full-band capture tuner according to one exemplary embodiment.

The ADC 111 uses a preset sampling frequency to convert an analog signal into a digital signal. As shown in FIG. 3, the ADC 111 may for example use a sampling frequency of 2.7 GHz when conversion into a digital signal is performed with regard to a full-band 21, e.g. up to 1 GHz in order to scan multi-channels.

The broadcast signal receiving apparatus 10 according to one exemplary embodiment is configured by previously considering interference with the modules for wireless communication such as Wi-Fi 131, Bluetooth 142, or ZigBee 143 having frequency bands similar to the sampling frequency of the ADC 111, e.g. of 2.7 GHz.

For example, when the configuration of the exemplary embodiment is not taken into account, the ADC 111 using the sampling frequency of 2.7 GHz may interfere with transmission signals Tx of the wireless communication modules using 2.4 GHz~5 GHz. In this case, frequency mixing between the sampling frequency of the ADC 111 and the frequencies of the wireless communication modules may cause a garbled screen or a data loss when the tuner 11 is locked to a different frequency.

The signal processor 12 applies a preset signal processing process to a broadcast signal or a video signal received in the tuner 11. For example, the signal processing processes performed in the signal processor 12 include demultiplexing, decoding, de-interlacing, scaling, noise reduction, detail enhancement, etc. without limitations. The signal processor 12 may be materialized by a system-on-chip (SoC) where various functions are integrated, or an image processing board mounted with individual elements for performing the processes independently of one another.

The communicator 14 uses a plurality of channels different in frequency band in order to perform wireless communication with an external apparatus. For example, the communicator 14 may employ at least one communication among Wi-Fi, Bluetooth, Zigbee, and Z-wave to communicate with the external apparatus. In this case, the communication of the communicator 14 is not limited to those according to this exemplary embodiment, but may include other communication methods.

When the communicator 14 is materialized by a Wi-Fi module, the wireless communication may for example be performed using a frequency band of 2.4 GHz or a frequency band of 5 GHz. In this case, the communicator 14 may use different channel bandwidths (bandwidths) to perform the wireless communication even though the same frequency band is used. When the channel bandwidth may for example be set with 20, 40 or 80 MHz, the frequency used for the wireless communication is varied in range depending on the channel bandwidths.

When the broadcast signal receiving apparatus 10 is achieved by a TV or the like, the broadcast signal receiving apparatus 10 may further include the display 13 and the input receiver 16.

The display 13 displays an image based on a broadcast signal or an image signal output from the signal processor 12. The display 13 may be materialized in various types, such as a plasma display panel (PDP), a liquid crystal display (LCD), an organic light emitting diode (OLED), a flexible display, etc. without limitations.

The input receiver 16 receives a user's input for controlling at least one function of the broadcast signal receiving apparatus 10. For example, the input receiver 16 may receive a user's input for selecting a part of a user interface (UI) displayed on the display 13. The input receiver 16 may be materialized by an input panel provided on an outer side of the broadcast signal receiving apparatus 10 or a remote controller using infrared rays to communicate with the broadcast signal receiving apparatus 10. Further, the input receiver 16 may be materialized by a keyboard, a mouse, and the like connected to the broadcast signal receiving apparatus 10, or may be materialized by a touch screen provided in the broadcast signal receiving apparatus 10.

According to one exemplary embodiment, the input receiver 16 may receive a user's input from a mobile device (not shown) communicating with the broadcast signal receiving apparatus 10 by Wi-Fi, Bluetooth or infrared. In this case, the mobile device may be provided as a smartphone or the like installed with a remote-control application by way of example, and execute the remote-control application to send the broadcast signal receiving apparatus 10 a user's input based on button touch for controlling the operations of the broadcast signal receiving apparatus 10.

The storage 17 is materialized by a flash memory such as a nonvolatile memory in which data is retained regardless of whether the broadcast signal receiving apparatus 10 is powered on or off. The storage 17 is configured to store a plurality of instructions for executing a program. Each of the instructions stored in the storage 17 may be subjected to reading, wiring, editing, deleting, updating, etc. According to one exemplary embodiment, a computer program product comprises the storage 17 storing a plurality of instructions and a processor 15. The instruction is executed by the processor 15 and controls communication to be performed using a channel, which has less interference between a locking frequency selected for receiving a broadcast signal and a frequency band, among a plurality of channels different in the frequency band from each other. The instruction determines the channel having less interference based on a sampling frequency used in applying analog-to-digital (AD) conversion to the broadcast signal.

The storage 17 is configured to store information about a frequency interference section in which interference between the locking frequency used by the tuner 11 and the frequency band used by the communicator 14 occurs. The storage 17 may be configured to store information about whether a channel is unavailable or available for the communicator 14 according to locking frequencies on the basis of the frequency interference section.

The processor 15 performs a control process for controlling a plurality of functions supported by the broadcast signal receiving apparatus 10. The processor 15 may be materialized by a central processing unit (CPU), and include three areas for a control, an operation and a register. In the control area, a program instruction is interpreted, and the elements of the broadcast signal receiving apparatus is controlled on the basis of the interpreted instruction. In the operation area, an arithmetical operation and a logical operation are performed, and the operation necessary for the elements of the broadcast signal receiving apparatus 10 is performed in response to an instruction from the control area. In the register area, pieces of information required while the CPU executes an instruction are stored, instructions and data for the elements of the broadcast signal receiving apparatus 10 are stored, and operation results are stored.

The processor 15 may include a control program for performing a control process, a nonvolatile memory in which the control program is installed, a volatile memory to which at least a part of the installed control program is loaded, and at least one microprocessor for executing the loaded control program.

The control program may include a program(s) given in the form of at least one among a basic input output system (BIOS), a device driver, an operating system, a firmware, a platform, an application program (or application). According to one exemplary embodiment, the application program may be previously installed or stored in the broadcast signal receiving apparatus 10 when the broadcast signal receiving apparatus 10 is manufactured, or may be installed in the broadcast signal receiving apparatus 10 on the basis of application data received from an external apparatus as necessary in the future.

The external apparatus may be a recording medium for storing data of a program to be executable by a computer, and may be a recording medium for storing the application data. Alternatively, the external apparatus may be a network server, and the application data may for example be downloaded from an application market or the like network server to the broadcast signal receiving apparatus 10. In this case, the network server may offer the data of the application program stored in the recording medium to the broadcast signal receiving apparatus 10.

Figure 4:
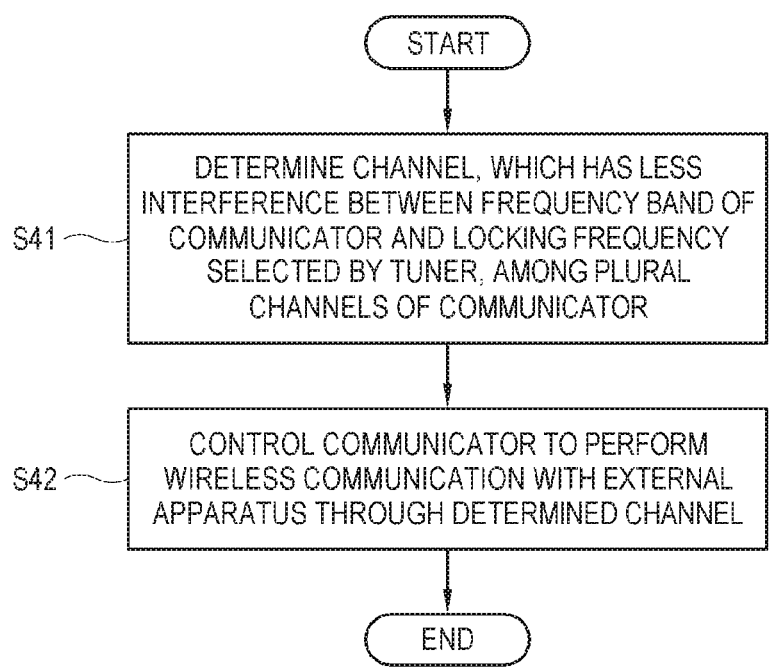
FIG. 4 is a flowchart of a method of controlling a broadcast signal receiving apparatus according to one exemplary embodiment.

According to an exemplary embodiment, the operations of the processor 15 may be shown in the flowchart of FIG. 4. First, at operation S41, the processor 15 determines a channel having less interference between the locking frequency selected by the tuner 11 and the frequency band of the communicator 14 among the plurality of channels of the communicator 14.

According to one exemplary embodiment, the operation S41 may include an operation that a channel having less interference is determined on the basis of the sampling frequency used at analog/digital conversion of the tuner 11. Specifically, a frequency interference section, in which interference is anticipated between the locking frequency of the tuner 11 and the frequency band of the communicator 14, may be previously determined to design the broadcast signal receiving apparatus 10, and information about the frequency interference section may be stored when the broadcast signal receiving apparatus 10 is manufactured. Thus, the processor 15 may refer to the stored information with regard to a channel to which the tuner 11 is tuned, and perform wireless communication through a channel having less interference with the locking frequency used by the tuner 11.

According to one exemplary embodiment, the operation S41 may include an operation that the channel used by the communicator 14 is changed when the locking frequency being currently used by the tuner 11 belongs to the frequency interference section.

Next, at operation S42, the processor 15 controls the communicator 14 to perform the wireless communication with the external apparatus through the determined channel.

According to one exemplary embodiment, the operations of the processor 15 may be carried out by only the broadcast signal receiving apparatus 10, but may be also carried out an external server (not shown) connecting with the broadcast signal receiving apparatus 10. Alternatively, some operations of the processor 15 may be performed by the broadcast signal receiving apparatus 10, and the other operations may be performed by the connected external server (not shown).

For example, the broadcast signal receiving apparatus 10 may previously determine and store the frequency interference section based on a difference between the sampling frequency of the tuner 11 and the frequency band of the communicator 14 when the broadcast signal receiving apparatus 10 is manufactured. The processor 15 may transmit information about the stored frequency interference section to the external server through the communicator 14 when the tuner 11 is tuned to the channel. In this case, the external server may store the received information about the frequency interference section, and information about available and unavailable channels according to the locking frequencies on the basis of the frequency interference section.

Further, the broadcast signal receiving apparatus 10 may receive the information about the available and unavailable channels corresponding to the locking frequency of the tuner 11 from the external server, so that the processor 15 can perform wireless communication using a channel having less interference between the locking frequency and the frequency band on the basis of the received information when the tuner 11 is locked.

According to one exemplary embodiment, the processor 15 may inactivate the communicator 14 in response to a user's input when the locking frequency being currently used by the tuner 11 belongs to the frequency interference section. For example, when interference is caused by Wi-Fi communication while a user views broadcasting, the user is informed of the interference though the UI, and allowed to make an input to inactivate the Wi-Fi module. However, while the broadcast signal receiving apparatus 10 is carrying out a predetermined operation based on communication with the external apparatus, the inactivation of the communicator 14 is restricted.

As described above, the broadcast signal receiving apparatus 10 according to an exemplary embodiment may previously avoid the frequency interference caused by the wireless communication, in terms of receiving a broadcast signal. Further, image quality is guaranteed even when the wireless communication is used in receiving the broadcast signal.

Figure 5:
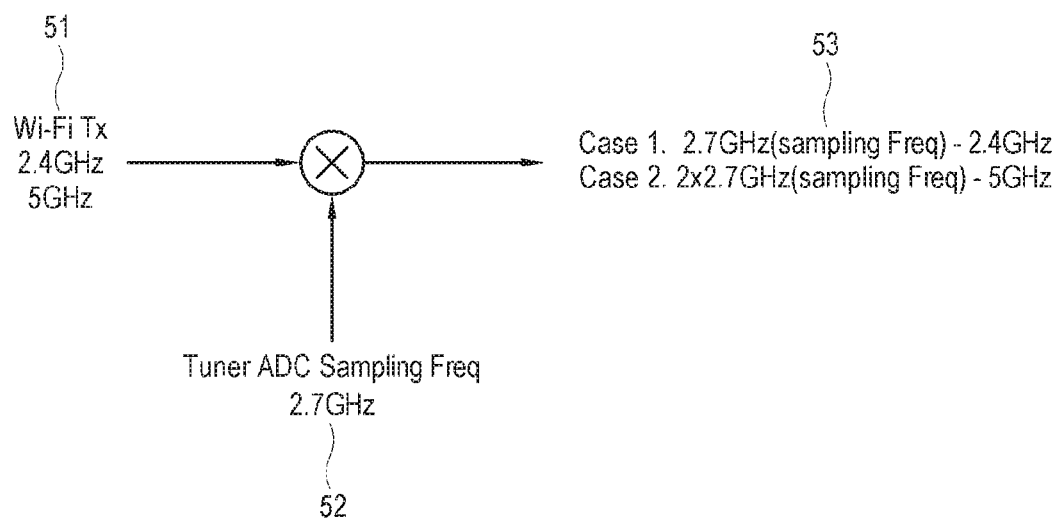
FIG. 5 illustrates an example that a frequency interference section between a sampling frequency of a tuner and a frequency band of wireless communication is determined according to one exemplary embodiment.

FIG. 5 illustrates an example of a frequency interference section between a sampling frequency of a tuner and a frequency band of a wireless communication according to one exemplary embodiment. As shown in FIG. 5, when the ADC 111 of the tuner 11 occupies a sampling frequency 52 of 2.7 GHz, the sampling frequency may interfere with a frequency band 51 occupied by the Wi-Fi module. In this case, the frequency interference section is previously calculated using a difference between the sampling frequency 52 and the frequency band 51 and stored at manufacture, and the wireless communication based on the stored frequency interference section is performed through a channel having less interference when the tuner 11 is locked.

For example, when the sampling frequency 52 is 2.7 GHz, and the channel bandwidth and the frequency band 51 occupied by the Wi-Fi module are respectively 2.4 GHz and 20 MHz, the frequency interference section is determined as follows.

1) A difference between the sampling frequency 52 and the frequency band 51 is calculated.

2700 MHz−2412 MHz=288 MHz

2) Since interference occurs as much as the Wi-Fi channel bandwidth of 20 MHz in addition to the calculated difference of 288 MHz, the frequency interference section is determined as follows.

288 MHz±10 MHz=278−298 MHz

Likewise, the frequency interference section may be determined and stored at manufacture by the same method even when the channel bandwidth and the frequency band of the Wi-Fi module are different. In addition, sections where interference occurs may be determined and stored with regard to other wireless communication methods such as Bluetooth, ZigBee, etc.

FIG. 6 illustrates a table for determining whether a locking frequency belongs to a frequency interference section according to one exemplary embodiment. As shown in FIG. 6, the broadcast signal receiving apparatus 10 according to this exemplary embodiment stores information, which is going to be used for determining whether interference is present between the tuner 11 and the communicator 14, in the storage 17, and uses a channel having less interference to perform communication when the tuner is locked.

As shown in the table, the information stored for determining the interference includes at least one among a sampling frequency 61, a wireless communication frequency band 62, a channel bandwidth 63, a mixing frequency 64, a frequency interference section 65~66, a tuner locking frequency 67, interference value 68, and wireless communication frequency change 69. Some pieces of the foregoing information may be not stored in the storage 17 but determined using the other stored pieces of information.

In the given table, the mixing frequency 64 is calculated using a difference between the sampling frequency 61 of the ADC 111 and the frequency band 62 of the wireless communication.

The frequency interference section 65~66 is determined by reflecting the channel bandwidth 63 of the wireless communication in the calculated mixing frequency 64.

The interference value 68 is determined as TRUE by determining that interference occurs when the locking frequency being currently used in the tuner 11 is included in the frequency interference section 6566, but is determined as FALSE by determining that no interference occurs otherwise.

The wireless communication frequency change 69 is determined based on the interference value 68, so that the wireless communication frequency can be changed when the interference value 68 is TRUE, but the current frequency can be maintained when the interference value 68 is FALSE.

FIGS. 7 to 11 illustrate tables for defining channels available and unavailable during wireless communication according to locking frequencies according to one exemplary embodiment. The broadcast signal receiving apparatus 10 according to this exemplary embodiment uses the pieces of information determined on the table of FIG. 6, e.g. employs the frequency interference section 65~66 or the like to obtain information about the channels available and unavailable for the communicator 14 according to the locking frequencies of the tuner 11.

Further, the information obtained as described above is stored in the storage 17, and a scan list is adjusted to include only available channels based on the stored information when the communicator 14 scans the channels.

FIG. 7 shows a table where unavailable channels 72 and available channels 73 for Wi-Fi are tabulated according to the locking frequencies 71 under conditions that the sampling frequency is 2.7 GHz and the channel bandwidth and the frequency band occupied by Wi-Fi are respectively 2.4 GHz and 20 MHz.

For example, when the locking frequency 71 occupied by the tuner 11 is 280 MHz, the processor 15 controls the communicator 14 to perform wireless communication through channels #5 to #10 except channels #1 to #4, thereby preventing the interference with the wireless communication. That is, the processor 15 may adjust the scan list of the communicator 14 on the basis of the information previously stored at manufacture to avoid the occurrence of the frequency interference in advance, to thereby scan only the channels 72 available with respect to the current locking frequency 71.

FIG. 8 shows a table where unavailable channels 82 and available channels 83 for Wi-Fi are tabulated according to the locking frequencies 81 under conditions that the sampling frequency is 2.7 GHz and the channel bandwidth and the frequency band occupied by Wi-Fi are respectively 2.4 GHz and 40 MHz. FIG. 9 shows a table where unavailable channels 92 and available channels 93 for Wi-Fi are tabulated according to the locking frequencies 91 under conditions that the sampling frequency is 2.7 GHz and the channel bandwidth and the frequency band occupied by Wi-Fi are respectively 5 GHz and 20 MHz.

Figure 10:
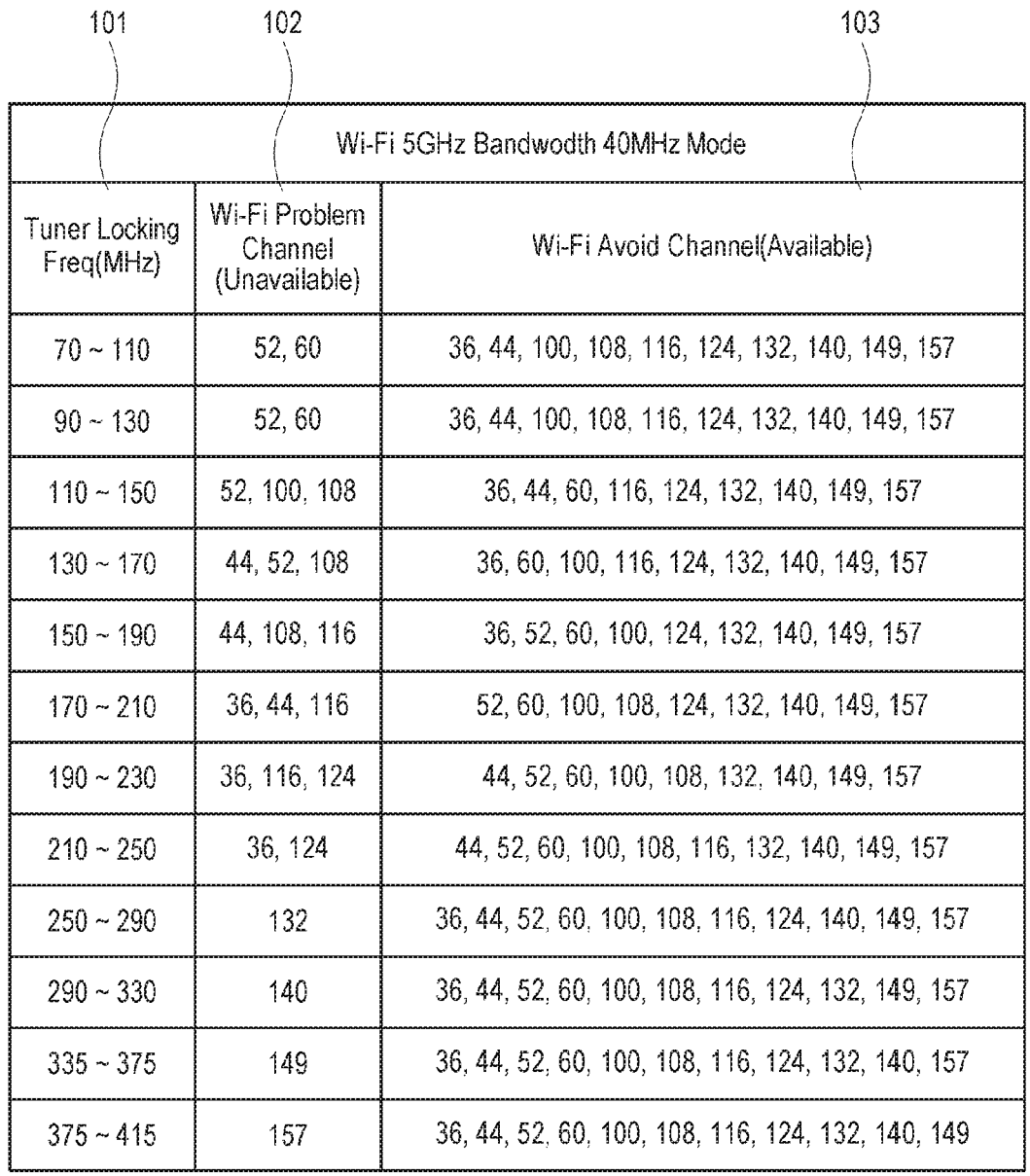
Figure 11:
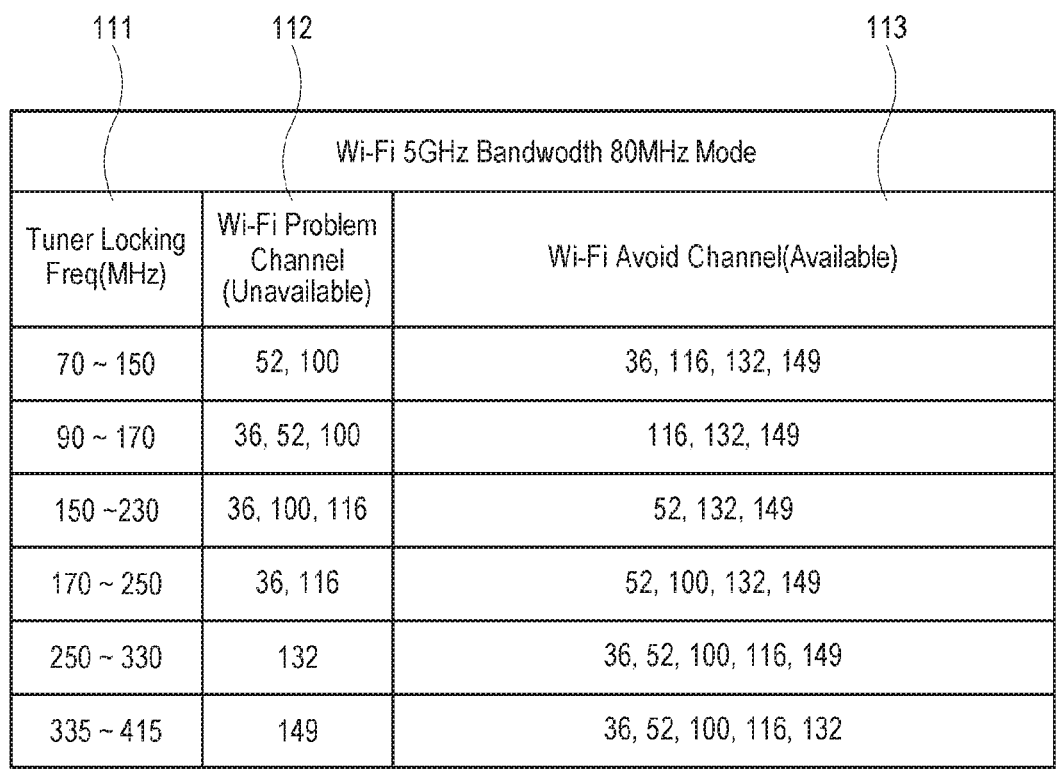

FIG. 10 shows a table where unavailable channels 102 and available channels 103 for Wi-Fi are tabulated according to the locking frequencies 101 under conditions that the sampling frequency is 2.7 GHz and the channel bandwidth and the frequency band occupied by Wi-Fi are respectively 5 GHz and 40 MHz. FIG. 11 shows a table where unavailable channels 112 and available channels 113 for Wi-Fi are tabulated according to the locking frequencies 111 under conditions that the sampling frequency is 2.7 GHz and the channel bandwidth and the frequency band occupied by Wi-Fi are respectively 5 GHz and 80 MHz.

Referring to the tables shown in FIGS. 7 to 11, it will be understood that the channels available for Wi-Fi range wider as the channel bandwidth for Wi-Fi decreases and the frequency band for Wi-Fi becomes higher.

As described above, the channels that may interfere with the wireless communication according to the locking frequencies of the tuner 11 are defined in advance, and thus scanning may be performed with regard to the scan list including only the channels available for the wireless communication.

Figure 12:
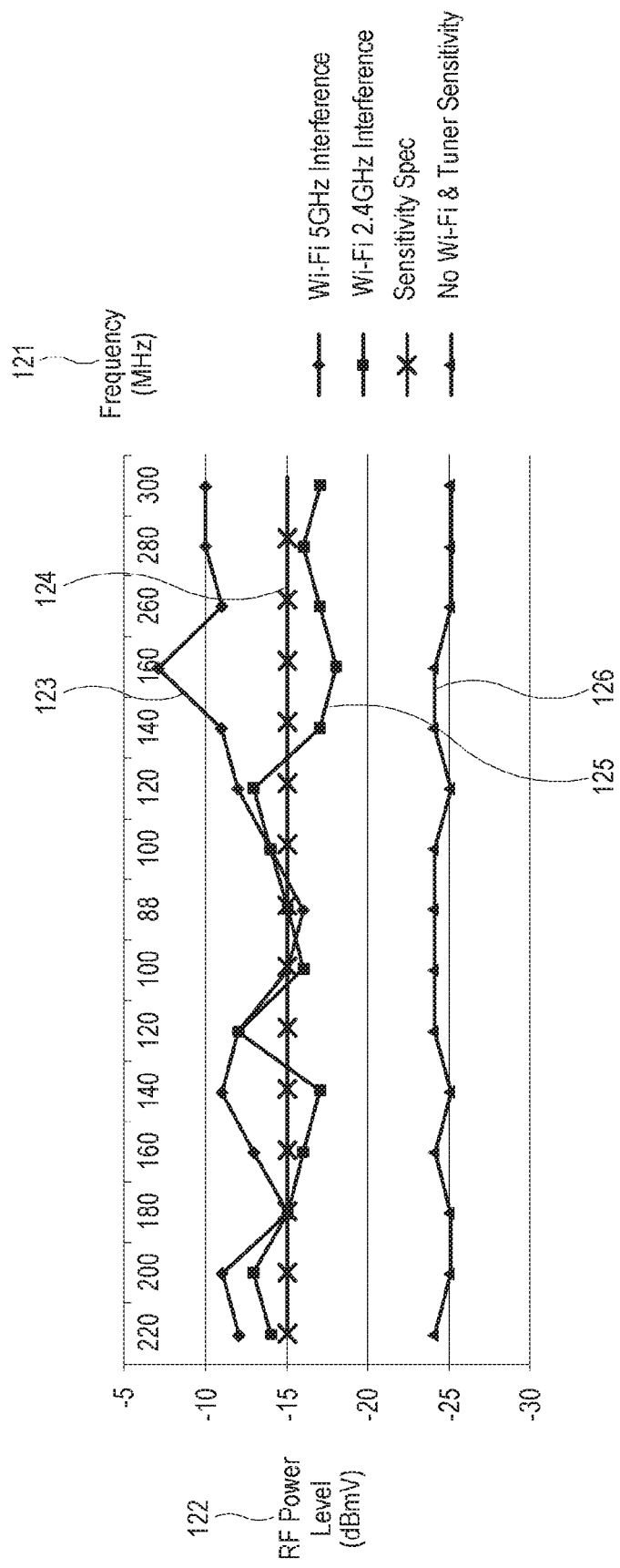
FIG. 12 illustrates an example of performance test results of a tuner affected by interference with Wi-Fi communication according to one exemplary embodiment.

FIG. 12 illustrates an example of performance test results of a tuner affected by interference with Wi-Fi communication according to one exemplary embodiment. The graph of FIG. 12 shows a relationship between performance of the tuner 11 and interference with a Wi-Fi transmission signal Tx. Here, the performance of the tuner 11 is measured based on radio frequency (RF) sensitivity, and for example the graph shows results of measuring RF power levels dBmV 122. To guarantee the performance of the tuner, a screen has not to be garbled in a section where the RF power level 122 ranges from −15 dBmV to +15 dBmV.

However, when a screen is garbled in a section where the RF power level 122 ranges from −15 dBmV to +15 dBmV, it is determined that the RF sensitivity of the tuner 11 is high. That is, it will be appreciated that the interference with the Wi-Fi communication lowers the performance of the tuner 11.

In FIG. 12, when the graph is drawn above a reference value 124, e.g. −15 dBmV of the RF power level 122, it is determined that the reception performance of the tuner 11 is lowered by Wi-Fi interference.

For example, when the frequency band for Wi-Fi is 5 GHz (see '123'), the RF power level 122 mostly ranges within a section from −15 dBmV to −5 dBmV with respect to the locking frequency 121. In this case, it will be understood that the performance of the tuner 11 is considerably lowered by the Wi-Fi interference.

Further, when the frequency band for Wi-Fi is 2.4 GHz (see '125'), the RF power level 122 ranges within a section from −20 dBmV to −10 dBmV with respect to the RF locking frequency 121. In this case, the performance of the tuner 11 is less affected by the Wi-Fi interference than that in the frequency band of 5 GHz (see '123').

When the Wi-Fi communication is turned off (see '126'), the RF power level 122 ranges within a section from −25 dBmV to −24 dBmV lower than −15 dBmV with respect to the locking frequency 121, and thus there are no garbled screens caused by the frequency interference.

Figure 13:
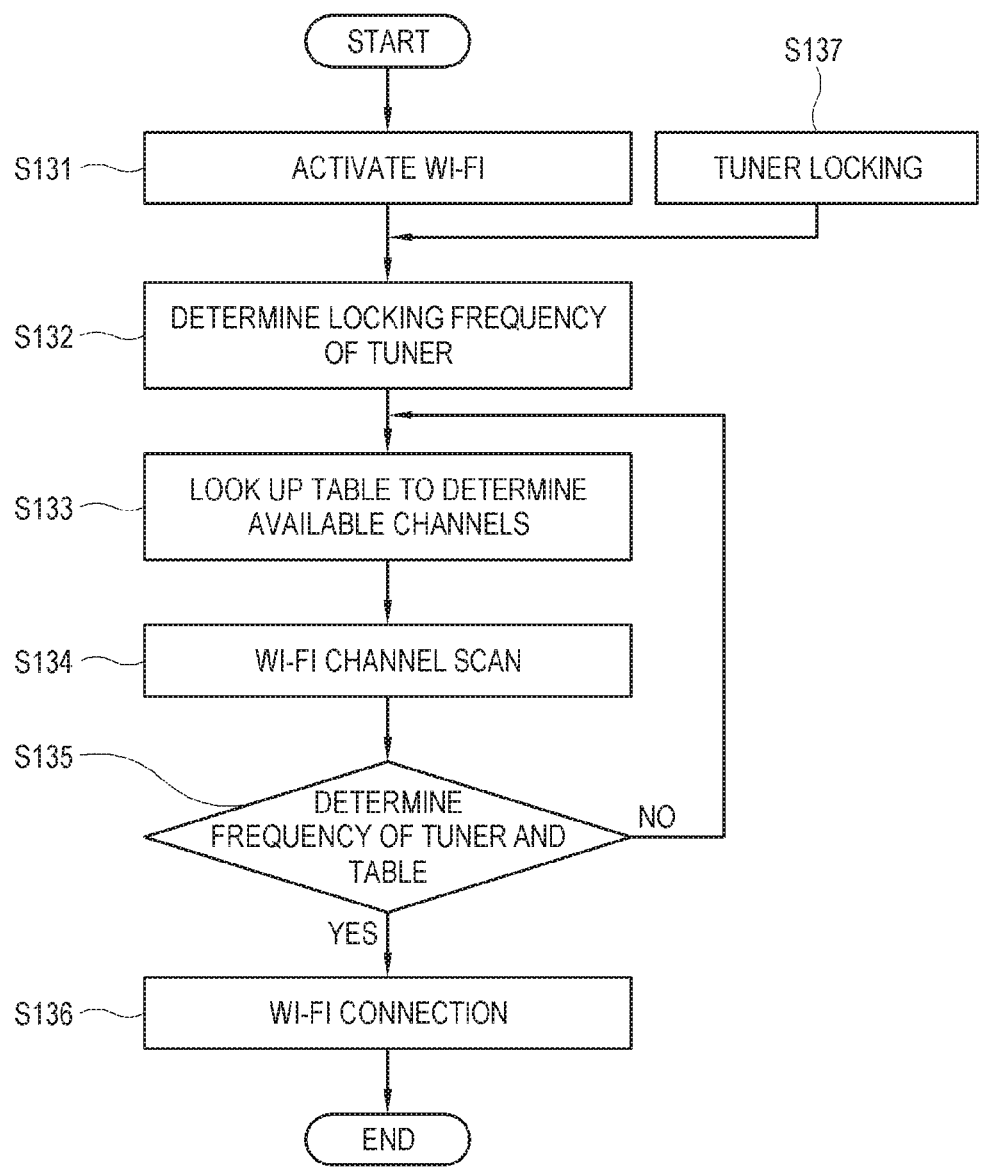
FIG. 13 is a flowchart of performing wireless communication even when frequency interference occurs between a tuner and a Wi-Fi module according to one exemplary embodiment.

FIG. 13 is a flowchart showing operations of the broadcast signal receiving apparatus 10 according to another exemplary embodiment. As shown in FIG. 13, when the processor 15 activates Wi-Fi communication at operation S131 and the tuner is locked at operation S137, the locking frequency of the tuner is determined at operation S132.

Next, at operation S133, the processor 15 looks up the table to determine the channels available for the determined locking frequency. For example, the processor 15 may determine what channel is available or unavailable for the Wi-Fi communication with regard to the determined locking frequency on the basis of the stored information.

Next, at operation S134, the processor 15 controls the communicator 14 to scan the Wi-Fi channels. For example, the processor 15 adjusts the scan list to include only the channels available for the Wi-Fi communication with respect to the determined locking frequency, and controls the communicator 14 to scan only the channels included in the scan list.

The processor 15 determines the frequency of the tuner 11 and the table at operation S135, and controls the communicator 14 to perform the Wi-fi connection through the scanned available channels at operation S136.

With these operations, the broadcast signal receiving apparatus 10 according to an exemplary embodiment provides an image with high quality by previously avoiding the channels that may interfere with the Wi-Fi communication with respect to the locking frequencies of the tuner 11.

As described, according to an exemplary embodiment, the frequency interference with the wireless communication is effectively avoided in advance in terms of receiving the broadcast signal.

Further, image quality is guaranteed even when the wireless communication is used, in terms of receiving the broadcast signal.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. A broadcast signal receiving apparatus comprising:
   a tuner configured to be tuned to a selected locking frequency corresponding to a broadcast signal, to receive the broadcast signal at the selected locking frequency, and to provide a converted broadcast signal obtained by converting the received broadcast signal with a predetermined sampling frequency;
   a communicator configured to perform wireless communication with an external apparatus through a plurality of channels having different respective frequency bands; and
   a processor configured to identify a channel, among the plurality of channels, having less interference between the selected locking frequency and the respective frequency band of the plurality of channels based on the predetermined sampling frequency of the tuner, and control the communicator to perform the wireless communication through the channel identified to have the less interference.

2. The broadcast signal receiving apparatus according to claim 1, wherein the processor is configured to identify the channel to be used for the wireless communication based on a frequency interference section where interference occurs between the selected locking frequency and the respective frequency band of the plurality of channels.

3. The broadcast signal receiving apparatus according to claim 2, wherein the frequency interference section is identified based on a difference between the predetermined sampling frequency and the respective frequency band of the plurality of channels.

4. The broadcast signal receiving apparatus according to claim 2, further comprising a storage configured to store information about channels that are available for the communicator with regard to the selected locking frequency based on the frequency interference section,
   wherein the processor is configured to control the communicator to adjust a scan list for the plurality of channels based on the stored information.

5. The broadcast signal receiving apparatus according to claim 2, wherein the processor is configured to change a channel being used by the communicator when the selected locking frequency belongs to the frequency interference section.

6. The broadcast signal receiving apparatus according to claim 2, further comprising an input receiver configured to receive an input from a user,
    wherein the processor is configured to inactivate the communicator in response to the input when the locking frequency belongs to the frequency interference section.

7. The broadcast signal receiving apparatus according to claim 1, wherein the communicator communicates with the external apparatus through at least one communication method among Wi-Fi, Bluetooth, ZigBee, and Z-wave.

8. The broadcast signal receiving apparatus according to claim 1, wherein the tuner comprises a full-band capture tuner.

9. A computer program product comprising:
    a memory configured to store a plurality of instructions; and
    a processor configured to execute the stored plurality of instructions to control a broadcast signal receiving apparatus for communication to be performed using a channel, among a plurality of channels having different respective frequency bands, which has less interference between a selected locking frequency for receiving a broadcast signal and the respective frequency band of the plurality of channels,
    wherein the channel having the less interference is identified based on a predetermined sampling frequency used in providing a converted broadcast signal by converting the broadcast signal therewith.

10. A method of controlling a broadcast signal receiving apparatus comprising a tuner configured to be tuned to a selected locking frequency corresponding to a broadcast signal, to receive the broadcast signal at the selected locking frequency, and to provide a converted broadcast signal obtained by converting the received broadcast signal with a predetermined sampling frequency, and a communicator configured to perform wireless communication with an external apparatus through a plurality of channels having different respective frequency bands, the method comprising:
    identifying a channel, among the plurality of channels of the communicator, having less interference between the selected locking frequency selected by the tuner and the respective frequency band of the plurality of channels of the communicator based on the predetermined sampling frequency of the tuner; and
    controlling the communicator to perform the wireless communication with the external apparatus through the identified channel.

11. The method according to claim 10, further comprising:
    identifying the channel to be used for the wireless communication based on a frequency interference section where interference occurs between the selected locking frequency and the respective frequency band of the plurality of channels.

12. The method according to claim 11, wherein the frequency interference section is identified based on a difference between the predetermined sampling frequency and the respective frequency band of the plurality of channels.

13. The method according to claim 11, further comprising:
    storing information about channels that are available for the communicator with regard to the selected locking frequency based on the frequency interference section; and
    by the communicator, adjusting a scan list for the plurality of channels based on the stored information.

14. The method according to claim 11, further comprising changing a channel being used by the communicator when the selected locking frequency belongs to the frequency interference section.

15. The method according to claim 11, further comprising inactivating the communicator in response to an input from a user when the locking frequency belongs to the frequency interference section.

16. The method according to claim 10, wherein the communicator communicates with the external apparatus through at least one communication method among Wi-Fi, Bluetooth, ZigBee, and Z-wave.

17. The method according to claim 10, wherein the tuner comprises a full-band capture tuner.

* * * * *